United States Patent
Noh et al.

(10) Patent No.: US 8,742,013 B2
(45) Date of Patent: Jun. 3, 2014

(54) SYNTHESIS OF LIPOAMIDE-GRAFTED HIGH MOLECULAR COMPOUND AND METHOD THEREFOR

(75) Inventors: Insup Noh, Seoul (KR); Seongyeun Jo, Seoul (KR); Doyeon Kim, Incheon (KR); Junghoon Woo, Seoul (KR)

(73) Assignee: Seoul National University of Technology Center for Industrial Collaboration, Seoul (KR)

( * ) Notice: Subject to any disclaimer, the term of this patent is extended or adjusted under 35 U.S.C. 154(b) by 738 days.

(21) Appl. No.: 12/608,126

(22) Filed: Oct. 29, 2009

(65) Prior Publication Data

US 2010/0272761 A1 Oct. 28, 2010

(30) Foreign Application Priority Data

Apr. 24, 2009 (KR) .................. 10-2009-0035818

(51) Int. Cl.
*A61K 38/18* (2006.01)
*A61K 47/36* (2006.01)
*A61K 47/38* (2006.01)
*C08B 15/06* (2006.01)
*C08B 37/02* (2006.01)
*C08B 37/04* (2006.01)
*C08B 37/08* (2006.01)
*C08B 37/10* (2006.01)

(52) U.S. Cl.
USPC ....... 525/61; 525/326.7; 525/329.5; 525/450; 424/78.08; 536/3; 536/20; 536/21; 536/30; 536/98; 530/300; 530/356; 530/350; 530/345; 530/399; 530/409; 530/410

(58) Field of Classification Search
USPC .................. 424/78.08; 536/3, 20, 21, 30, 98; 530/300, 356, 350, 345, 399, 409, 410; 525/61, 326.7, 329.5, 450
See application file for complete search history.

(56) References Cited

U.S. PATENT DOCUMENTS

2003/0044402 A1* 3/2003 Nelson .................. 424/94.6
2007/0149441 A1* 6/2007 Aeschlimann et al. .......... 514/8

FOREIGN PATENT DOCUMENTS

CA      2385867 C   *   9/2009
WO   WO 2009080220 A1 *   7/2009

OTHER PUBLICATIONS

Dubruel (in Surface Plasmon Resonance Spectroscopy as a Tool to Study Polyplex-Glycoaminoglycan Interactions, Macromolecular Rapid Communications, 2005, 26, 992-997.*
Kijima et al (in Hydrophilic Polymer-Immobilized Lipoamides-Iron(II) System as a New Reducing Catalyst for the Reduction of O-Benzylhydroxylamine by Sodium Borohydride, Journal of Polymer Science: Polymer Chemistry Edition, vol. 22, 821-830, 1984).*

* cited by examiner

*Primary Examiner* — Randy Gulakowski
*Assistant Examiner* — Rachel Kahn
(74) *Attorney, Agent, or Firm* — Lowe Hauptman & Ham, LLP

(57) ABSTRACT

The present disclosure provides polymer compounds binding with lipoamide produced by the reaction of the primary amine group of lipoamide with the carboxy group of polysaccharide compounds such as chondroitin sulfates, carboxymethyl celluloses, or hyaluronic acids; functional compounds such as peptides, proteins, growth factors; or drugs; or biocompatible polymers such as poly(ethylene oxide), poly(vinyl alcohol), or poly(vinyl pyrrolidone). The present disclosure also provides their synthesis methods, products of hydrogels and films using the same as and methods for manufacturing the products.

4 Claims, 12 Drawing Sheets

SYNTHESIS OF LIPOAMIDE-GRAFTED HIGH MOLECULAR COMPOUND AND METHOD THEREFOR

CROSS REFERENCE TO RELATED APPLICATION

This application claims the priority of Korean Patent Application No. 10-2009-0035818, filed on Apr. 24, 2009 in the KIPO (Korean Intellectual Property Office), the disclosure of which is incorporated herein in their entirety by reference.

TECHNICAL FIELD

This invention relates to a product of lipoamide-polysaccharide prepared by chemical binding of a lipoamide to polysaccharide compounds having at least one carboxyl group such as chondroitin sulfates, carboxymethyl celluloses, heparins and hyaluronic acids, and a method for preparing the same product, and also relates to a hydrogel using the same product.

BACKGROUND OF THE DISCLOSURE

Lipoamide is a trivial name for 6,8-dithiooctanoic amides and a form in which 6,8-dithiooctanoic acid is bound to protein via an amide bond of its carboxyl group with the amino group of lysine. Lipoamides can transfer acetaldehyde group to CoA to continue the TCA cycle. α-lipoic acid has been researched for preventing various diseases related to oxidative obstacle to mitochondrial functions. It has been known that lipoamides play a role of cofactor to an enzyme of α-oxo-acid dehydrogenase, stimulate recovery from myocardial infarction, and have physiological characteristics effectively to prevent cell necrosis with a role of antioxidant.

Polysaccharides such as chondroitin sulfates and hyaluronic acids which are used with the lipoamide in the present disclosure are biological compounds fermented by microorganisms or extracted from animals and have free carboxyl groups in their molecules. They are multilaterally used in the industrial fields of medical engineering, biocompatible materials, chemistry, medical science, biotechnology, and cosmetics. They are employed as materials for drug or cell delivery carriers, medicines for curing arthritis, and scaffolds for tissue engineering such as artificial cartilages, and the likes in medical science and engineering, and moisturizers in cosmetics.

To date, no biocompatible polymers using both lipoamide and chondroitin sulfate for tissue engineering have been reported. Known patents and patent applications related to lipoamide are "composition for diagnosis of liver cell cancer, liver cell cancer diagnosis kit including the same, and liver cell cancer diagnosis method", "method for sterilizing albumin-inclusive formulations", "pharmaceutical composition including hydroxymic acid derivatives", and "sterilization method of biological components", though they fail to suggest what this disclosure provides for.

Acknowledged patent documents related to the polysaccharide compounds of hyaluronic acid and chondroitin sulfate are "biodecomposable thermal-sensitive polyphosphazene hydrogel, its preparation method and its use", "tissue engineering implant for nerve regeneration using biocompatible injection hydrogel", "composition and method for restoration and regeneration of cartilage and other tissues", "composition for liver cell cancer diagnosis, liver cell cancer diagnosis kit including the same, and liver cell cancer diagnosis method", "liquid and method for preventing tissue adhesion", and "method for curing hair and nail using alkanolamine". Recently, there have been reported studies on the various excellent biological characteristics of chondroitin sulfate and hyaluronic acid such as stanching function (oligosaccharide's property for prevention of blood coagulation), bioactive material delivery carrier (the characteristic of hydrogel material and drug delivery system as a binding of DNA-chondroitin sulfate and hyaluronic acid), and scaffold for tissue engineering to show the possibility of its application as biocompatible materials.

Carboxymethyl cellulose is a kind of nontoxic polysaccharide compound, in which the alcohol group of glucopyranose monomer consisting of the skeleton of cellulose is substituted with carboxymethyl group. It does not cause an allergy reaction and is used as biocompatible material for medical appliances such as antiadhesion agent due to its excellent biocompatibility. It is also used as eye drops agent, food material, paste material and viscosity enhancer by adjusting its properties in its high viscosity and leading to the bond of carboxymethyl group. Acknowledged patents related to carboxymethyl cellulose are "carboxymethyl cellulose binder and lithium battery employing the same", "biodecomposable pharmaceutical composition and particulate formulation which enable human growth hormone continuously to be released", "mucous membrane adhesive inotophoresis device", "opthalmological liquid including sodium carboxymethyl cellulose and hydroxypropylmethyl cellulose", "bioabsorbable composition of carboxy polysaccharide polyether interpolymer complex and method for using the same for decreasing surgical operational adhesion", "composition for bone filling to promote osteogenesis and early bone hardening", and "method for preparing amphiphilic heparin derivative to increase absorption at the mucous membrane", as they prove the medical usability of carboxymethyl cellulose.

Acknowledged patents related to heparin are "multifunctional amphiphilic copolymer and method for preparation of the same", "method for preparing amphiphilic heparin derivative to increase absorption at the mucous membrane", "bioactive material fixed artificial blood vessel", and "angiogenesis heparin bound peptide amphiphilic compound", although there are none patented to use heparin and lipoamide together.

Studies on industrial application of a product in the bound form of the lipoamide and polysaccharide compounds have not been active in spite of the biological excellence of the respective lipoamide and polysaccharide compounds. Therefore, the present disclosure has been completed in an effort to make lipoamide derivatives, hydrogel and film using the same to exhibit the biological functions of polysaccharide compounds to the maximum by means of binding the carboxy group in chondroitin sulfate, carboxymethyl cellulose, heparin and hyaluronic acid with the lipoamide, in order to fulfill the need to develop highly functional/high value added materials (for example, medicine materials) by making use of lipoamide which leads commercially to chondroitin sulfate, heparin, carboxymethyl cellulose and hyaluronic acid derivatives.

DISCLOSURE OF THE INVENTION

Therefore, an embodiment of the present disclosure provides lipoamide-polymer compounds produced by the reaction of the primary amine group of lipoamide with the carboxyl group of polysaccharide compounds such as chondroitin sulfates, carboxymethyl celluloses, heparins or hyaluronic acids; peptides, proteins, or growth factors; or drugs, or medical polymers such as poly(ethylene oxide), poly(vinyl alcohol), or poly(vinyl pyrrolidone). The present disclosure also provides their synthesis methods, products of hydrogel and film using the same and method for manufacturing the products. In the hydrogel and film, the lipoamide-polymer compounds are cross-linked by its reaction with an unsaturated compound in the form of Michael type addition reaction.

Another embodiment of the present disclosure provides bioactive material carriers or scaffolds for tissue engineering which are produced by putting bioactive materials such as cells, growth factors, hormones and drugs into the hydrogel and film of chondroitin sulfates, carboxymethyl celluloses, heparins, hyaluronic acids, peptides, and proteins.

In one aspect, the present disclosure provides polymer compounds produced by binding at least one amine group of lipoamides with compounds having at least one carboxyl group.

In another aspect, the present disclosure provides polymer compounds produced by the Michael type addition reaction of the polymer compounds bound with the lipoamides to biocompatible polymer compounds having at least one unsaturated hydrocarbon functional group.

The polymer compounds may be a hydrogel or film.

The compounds having carboxyl group may be at least one selected from the group consisting of heparins, hyaluronic acids, carboxymethyl celluloses, dermatan sulfates, chitosans, dextrans, alginates, and chondroitin sulfates.

The unsaturated hydrocarbon functional group may have methacrylate, acrylate or one or more unsaturated functional group in the middle of the hydrocarbon.

The compounds having carboxyl group may be at least one selected from the group consisting of peptides, collagen, proteins, hormones, drugs and growth factors.

The compounds having carboxyl group as described above may be at least one selected from the group consisting of poly(ethyleneoxide), poly(vinyl alcohol), poly(vinyl pyrrolidone), polylactides and polyglycolides.

The polymer compounds can slowly release bioactive materials in the form of hydrogel or film.

In yet another aspect, the present disclosure provides polymer compounds produced by the method comprising the steps of adding at least one bioactive material selected from the group consisting of cells, drugs, growth factors and hormones into at least one solution of a polymer solution produced by binding at least one amine group of the lipoamide with a compound having carboxyl group and a biocompatible polymer solution having at least one unsaturated hydrocarbon functional group, and mixing said two solutions to perform Michael type addition reaction.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
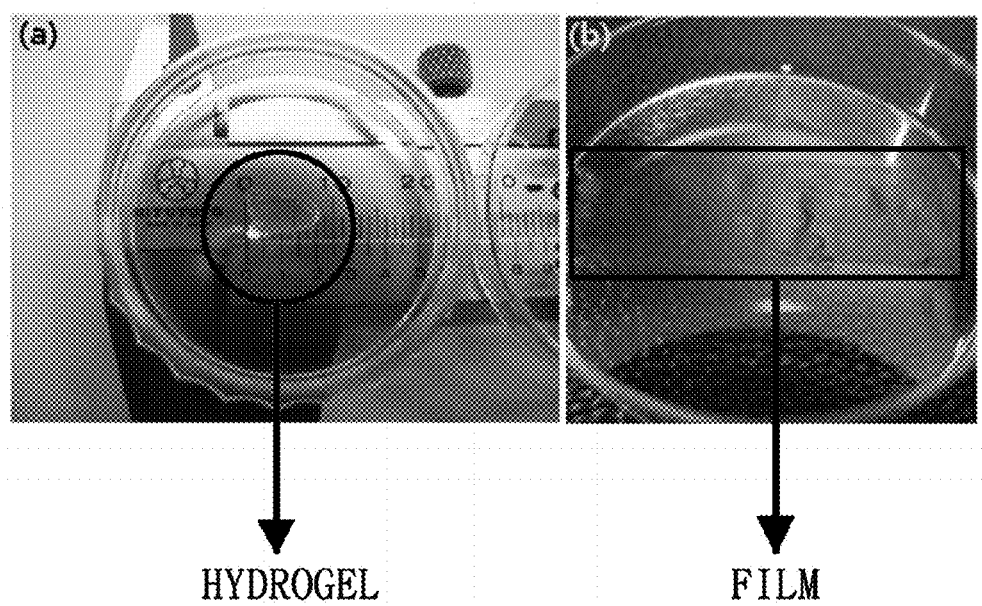
FIG. 1 shows hydrogel at (a) and film at (b) of chondroitin sulfate respectively produced according to an example of the method of the present disclosure.

A more complete disclosure and many of the attendant advantages thereof will be better appreciated by reference to the following detailed description in conjunction with the accompanying drawings.

The term "hydrogel" used in this description means a three-dimensional structure of hydrophilic polymer having a sufficient amount of water. For the purpose of the present disclosure, the hydrogel is a hydrogel produced by the reaction between chondroitin sulfate, carboxymethyl cellulose, heparin or hyaluronic acid derivatives bound with lipoamide ('lipoamide derivative') and polymer compounds such as chondroitin sulfates, carboxymethyl celluloses, heparins, hyaluronic acids or the other polymers having (meth)acrylate or unsaturated functional group.

The term "film" used in this description means a solid phase to maintain its form in comparison to the hydrogel, but its composition is same as that of the hydrogel.

The term "bioactive material" used in this description means a material used for curing, remedying, preventing or diagnosing diseases, without limitations. Such an bioactive material includes organic synthetic compounds, extracts, proteins, peptides, nucleic acids, lipids, hydrocarbons, steroids, extracellular matrix and cells. The term "drug" used in this description may be also included in the bioactive material. Various formulation aids used in this technical field such as diluents, release retardants, inert oils, and binders may be optionally mixed with the active material.

The term "bioactive material carrier" used in this description means a device produced by binding the bioactive material with it physically or chemically to deliver it into a living body.

The term "bioactive scaffold for tissue engineering" used in this description means a hydrogel material comprising a new chondroitin sulfate or hyaluronic acid-peptide which is produced by chemically binding a peptide having an inducing function of tissue regeneration with the network of chondroitin sulfate or hyaluronic acid.

In one aspect, the present disclosure relates to chondroitin sulfate or hyaluronic acid derivative hydrogels and their films in which thiol derivatives of chondroitin sulfates are cross-linked with chondroitin sulfate or hyaluronic acid derivatives covalently bound with molecules having at least one unsaturated group in the middle of the molecule.

Chondroitin sulfate used in this disclosure is water-soluble and has a molecular weight of 1 to 1,000 kDa, preferably, 3 kDa to 300 kDa. It is excellent in biocompatibility and low in antigen property, and is decomposed/absorbed in a living body so as to be desirable as medical material.

For example, in the case that the molecule having at least one unsaturated group in the middle of the molecule is an unsaturated lipid, the chondroitin sulfate derivatives used in the hydrogel in accordance with the present disclosure are formed by the carboxyl group at its end being covalently bound with the amine group in the chondroitin sulfate lipoamide derivatives, and in the case that the carboxyl group at the end of the unsaturated lipid is substituted with amino group, the chondroitin sulfate derivatives are formed by the amine group in the unsaturated lipid being covalently bound with carboxyl group in the chondroitin sulfate derivatives. Such a binding induces chondroitin sulfate derivatives attached with the unsaturated hydrocarbon molecule.

As such, gels or films are prepared by the Michael type reaction between the thiol group of the chondroitin sulfate-lipoamide derivatives and the unsaturated hydrocarbon group of the chondroitin sulfate-unsaturated hydrocarbon compound which is formed by the chemical bond of water-soluble chondroitin sulfates with the unsaturated hydrocarbon molecules having at least one unsaturated functional group. The gel and film can be prepared into different forms by controlling the concentration of the reactants.

Polysaccharide compounds covalently bound with the lipoamide may include chondroitin sulfates, carboxymethyl celluloses, hyaluronic acids, dermatan sulfates, carboxy chitosans, and heparins. It may also include biocompatible hydrophilic natural/synthetic polymers such as poly(ethylene oxide), poly(vinyl alcohol), and poly(vinyl pyrrolidone).

The molecule having unsaturated hydrocarbon group in the middle of the molecule covalently bound with chondroitin sulfates and hyaluronic acids may include unsaturated lipids, metabolites and pheromones.

More specifically, the examples may include biological molecules such as linoleic acid; linonenic acid; oleic acid; palmitic acid; palmitoleic acid; mead acid; arachidonic acid; cis-eicosa-5,8,11,14,17-pentaenoic acid; cis-docosa-7,10,13, 16-tetraenoic acid; cis-docosa-4,7,10,13,16-pentaenoic acid; octa-5,9,12-trienoic acid (colombinic acid); methyl-hydroxy-5,8,12,14-tetraenoate; laurencenynes; undeca-1,3,5,8-tetracenes; hydroxyeicosapentaenic acid; hydroperoxyeicostetraenic acid; phosphatidylethanolamine (18:2, 18:3, 20:4, 22:6 and the likes); phohspatidic acid (18:2, 22:6 and the likes); phosphatidylglycerols (18:2, 18:3, 22:6 and the likes); phosphatidylserines (22:6 and the likes); and Inositol (20:4 and the likes).

In a particular aspect of the present disclosure, in order to prepare the hydrogel, lipoamide is covalently bound with chondroitin sulfates to synthesize chondroitin sulfate-lipoamide, and unsaturated lipids are covalently bound with chondroitin sulfates, chitosans, hyaluronic acids and the likes to prepare chondroitin sulfate-, chitosan-, hyaluronic acid-unsaturated lipid. The chondroitin sulfate or hyaluronic acid hydrogel and film can be prepared by cross-linking the chondroitin sulfate or hyaluronic acid derivatives bound with the lipoamide and the chondroitin sulfate or hyaluronic acid derivatives having the unsaturated functional group in controlled reactants' concentrations. The ratio of the unsaturated functional group and the thiol group may be variously controlled in accordance with the use. The molar ratio of the unsaturated functional group and the thiol group may be 10:1 to 1:10, preferably 3:1 to 1:2, and more preferably 1:1.

Reaction Formula 1 shows the reaction between the carboxyl group of the polysaccharide derivatives and the amide (primary amine) group of the lipoamide in accordance with one embodiment of the present disclosure. In the formula, "R" represents compound derivatives such as chondroitin sulfates, dermatan sulfates, heparins, carboxymethyl celluloses, hyaluronic acids, peptides and proteins.

Reaction Formula 1

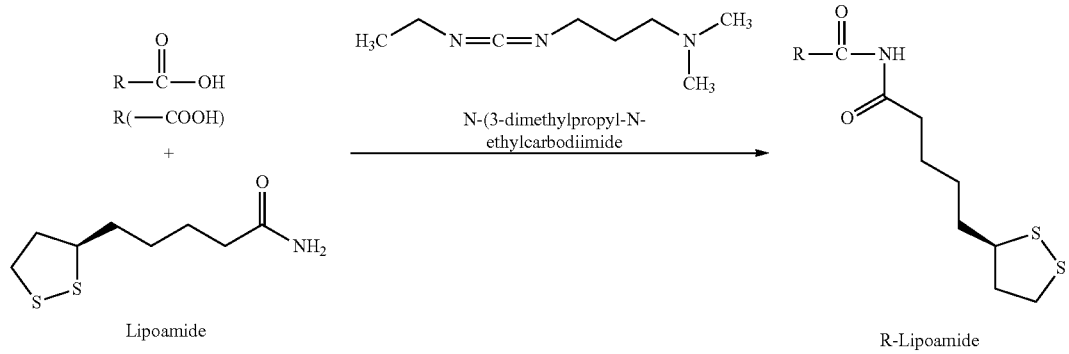

Reaction Formula 2
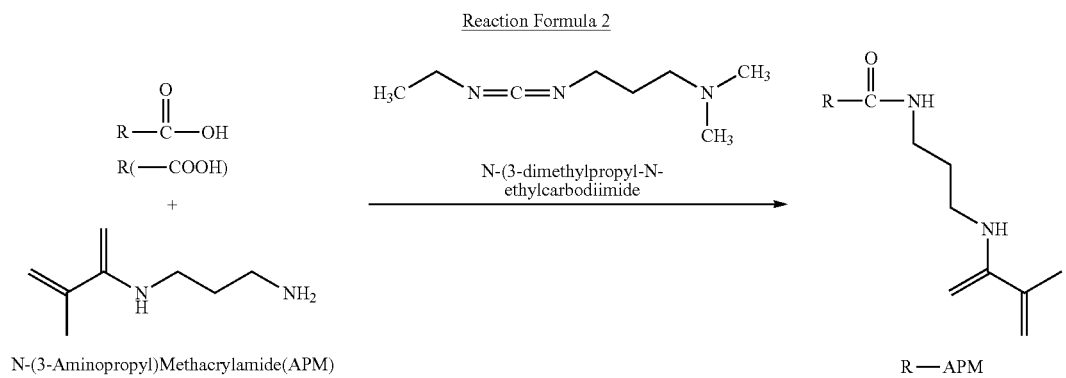
Reaction Formula 3
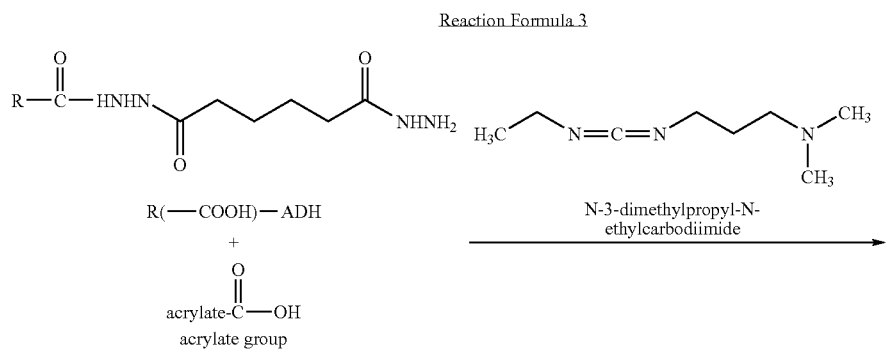
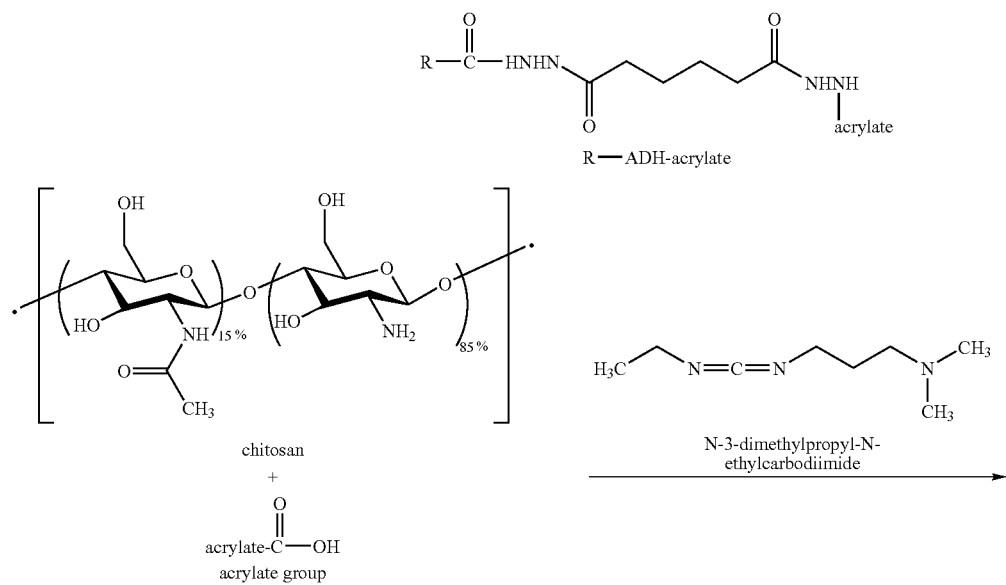

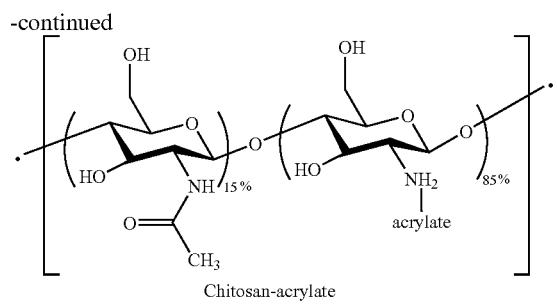

Chitosan-acrylate

Chemical Formula 1

Example peptide: RGD

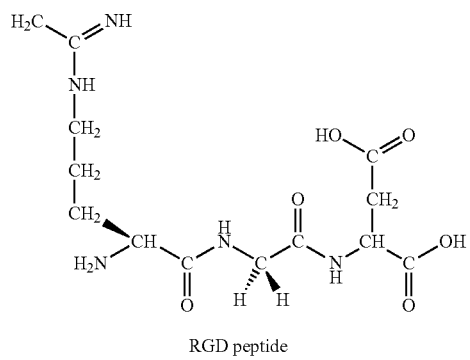

RGD peptide acrylate: acrylic acid, methacrylic acid, linoleic acid, or oleic acid

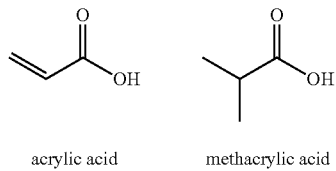

acrylic acid  methacrylic acid

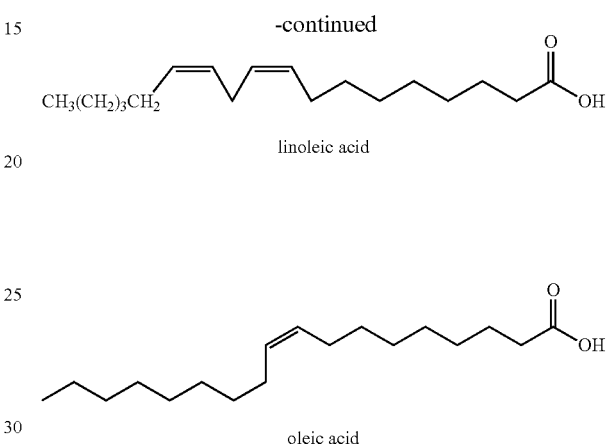

linoleic acid oleic acid

According to Reaction Formula 2 or 3, polysaccharide derivatives having double bond or triple bond at the end or middle of its side chain can be prepared by chemically binding polysaccharide compounds or chitosans having carboxyl group with molecules having acrylate, methacrylates or other unsaturated hydrocarbon functional group.

For example, as shown in Reaction Formula 4 below, hydrogel and film of polysaccharides such as chondroitin sulfates, celluloses and hyaluronic acids may be synthesized by the reaction of the thiol group derived from the reduction of the disulfide group of the lipoamide-polysaccharide compound with the unsaturated hydrocarbon functional group of the polysaccharide derivatives such as chondroitin sulfates and hyaluronic acids.

Reaction Formula 4

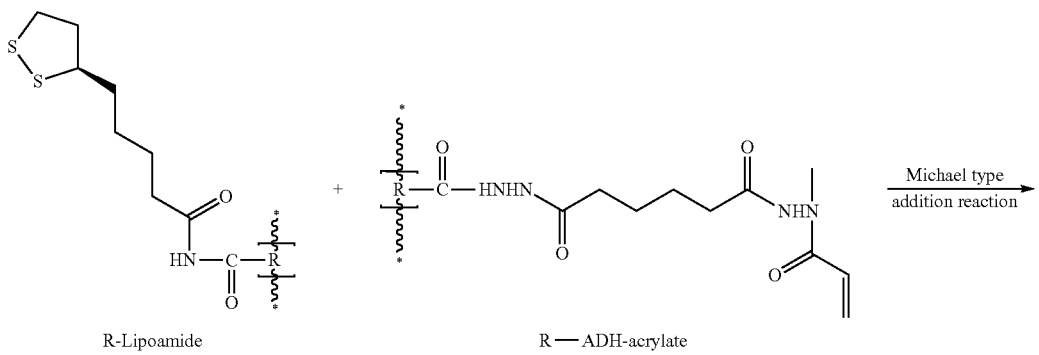

R-Lipoamide  R—ADH-acrylate

-continued

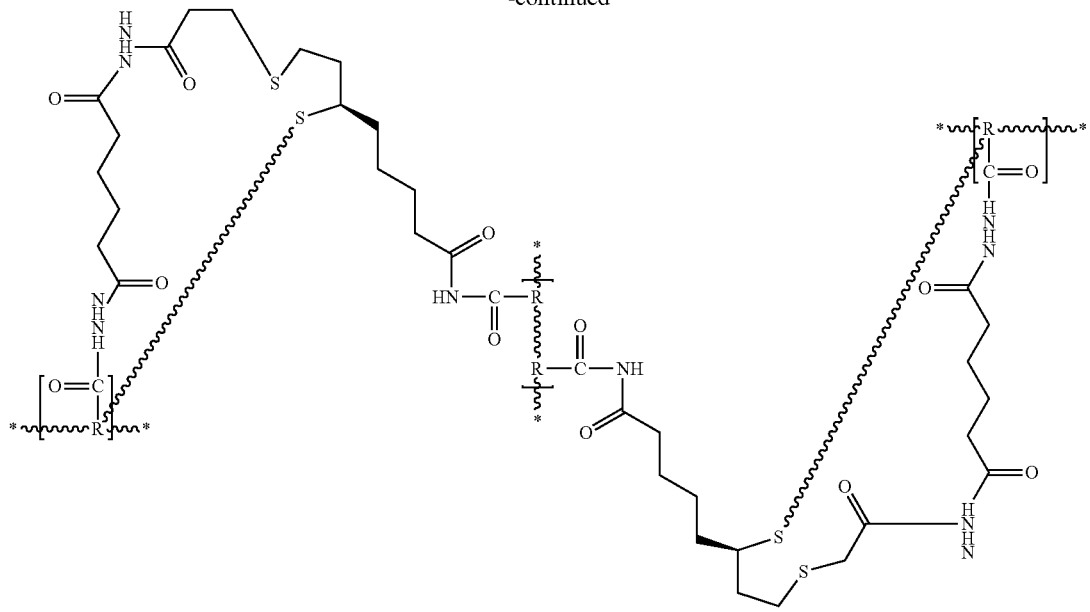

[R—ADH-Acrylate]-[R-Lipoamide]network

In the synthesis of the hydrogel and film of chondroitin sulfates bound with lipoamide, the used chondroitin sulfate derivatives may be formed by its covalent bonding with acrylate derivatives having unsaturated hydrocarbon functional group in the middle and end of the molecules. The acrylate derivatives having unsaturated hydrocarbon functional group at its end may be derived from materials having either acrylate or methacrylate group. The molar ratio of the acrylate group and the thiol group in the molecule is 10:1 to 1:10, preferably 4:1 to 1:3, more preferably 3:1 to 1:2, most preferably 1:1. The molar ratio of the unsaturated functional group and the thiol group is 10:1 to 1:10, preferably 3:1 to 1:2, more preferably 1:1. The molar ratio of the unsaturated functional group and the acrylate group in the molecule is 100:1 to 1:1, preferably 20:1.

The hydrogel and film of chondroitin sulfate, carboxymethyl cellulose, chitosan, dermatan sulfate and hyaluronic acid in accordance with the present disclosure are very stable due to its constitution of biological molecule so that they may be used as patches for curing wound, materials for cosmetic surgery such as wrinkle removal surgery, cosmetic materials, medicines for arthritis, and scaffolds for tissue engineering such as regeneration of nerve, skin, bone and cartilage.

The hydrogel and film of chondroitin sulfate, carboxymethyl cellulose, chitosan, hyaluronic acid in accordance with the present disclosure may be used as a bioactive material carrier. The polysaccharide compounds are known as biocompatible material and the hydrogel and film in accordance with the present disclosure may be prepared by simply mixing the solutions of the two materials. Therefore, the hydrogel including the biologically active material may be prepared by adding the active material into one solution of the prepared two solutions. The two solutions including the bioactive material may be delivered to disease/wound site by means of syringe so as to induce the formation of hydrogel including the active material with the time passing. Therefore, the hydrogel in accordance with the present disclosure is more desirable in the use of bioactive material carrier.

Therefore, in another aspect, the present disclosure relates to bioactive material carriers that a bioactive material is physio-chemically included in or bound to the hydrogel and film of chondroitin sulfate and hyaluronic acid. This carrier is delivered into a living body. In one embodiment of the present disclosure, a bioactive material is included into the hydrogel of chondroitin sulfate and hyaluronic acid to be injected into a living body. For a certain purpose, the active material may be slowly and constantly released at a predetermined site during a predetermined time period. In one embodiment, a drug for controlling physiological activity is bound with the chondroitin sulfate and hyaluronic derivative so that it forms a hydrogel or film to play a role of drug carrier. At this time, another physiological active material may be further included in the hydrogel and film.

Such an injectable carrier is useful in the cases that the delivery rate to the site of disease is low, that the administered drug with high price loses outside the body very fast, and that the side-effect is severe. In other words, it has advantages that the concentration of drug is constantly maintained at the healing site during long time by controlling the release velocity and that the drug is locally delivered to the diseased site by direct delivery to the site by injection.

In the hydrogel of chondroitin sulfate and hyaluronic acid in accordance with the present disclosure, the delivery velocity of the bioactive material can be controlled in accordance with the kind and concentration of the chemically bound drug, the physical strength and chemical characteristics of gel, the decomposition velocity of gel, and the like.

The organic compounds delivered into a living body with physical inclusion into or chemical bonding to the hydrogel of chondroitin sulfate and hyaluronic acid may include conventionally used antibiotics, anticancer medicines, anti-inflammatory drugs or painkillers, antivirus agents, and antimicrobial agents.

The antibiotics may include tetracycline, minocycline, doxycycline, ofloxacin, levofloxacin, ciprofloxacin, clarithromycin, erythromycin, cefaclor, cefotaxime, imipenem, penicillin, gentamicin, streptomycin, vancomycin, and their derivatives.

The anticancer medicines may include methotrexate, carboplatin, taxol, cisplatin, 5-fluorouracil, doxorubicin, etoposide, paclitaxel, camptothecin, cytosine arabinose, and their derivatives.

The anti-inflammatory drugs or painkiller may include indometacin, ibuprofen, ketoprofen, piroxicam, flurbiprofen, diclofenac, and their derivatives. The anti-virus agents may include acyclovir, ribavirin and their derivatives. The antimicrobial agent may include ketoconazole, itraconazole, fluconazole, amphotericin B, griseofulvin, and their derivatives.

The protein and peptide to be included in the hydrogel and film of chondroitin sulfate and hyaluronic acid and to be delivered into a living body may include various bioactive peptides and their derivatives such as hormones, cytokines, enzymes, antibodies, growth factors, transcript control factors, blood factors, vaccines, scaffolding proteins, ligand proteins, polysaccharides and receptors, cell surface antigen, and receptor antagonists used for healing or preventing diseases.

In particular, the examples may includes peptides such as bone growth factors, liver growth hormones, and growth hormone releasing hormones, interferons and interferon receptors (for example, interferon-alpha, -beta and gamma, water-soluble type I interferon receptor), granulocyte colony-stimulating factor, granulocyte macrophage colony stimulating factor, glucagon-like peptides (GLP-1 and the like), G-protein-coupled receptors, interleukins (for example, interleukin-1, -2, -3, -4, -5, -6, -7, -8, -9 and the like) and interleukin receptors (for example, IL-1 receptor, IL-4 receptor, and the like), enzymes (for example, glucocerebrosidase, iduronate-2-sulfatase, alpha-galactosidase-A, agalsidase alpha, alpha-L-iduronidase, butyrylcholinesterase, chitinase, glutamate decarboxylase, imiglucerase, lipase, uricase, platelet-activating factor acetylhydrolase, neutralendopeptidase, myeloperoxidase and the like), interleukin and cytokine binding proteins (for example, LI-18 bp, TNF-binding protein and the like), macrophage activating factor, macrophage peptides, B cell factor, T cell factor, protein A, allergy suppressor, tumor necrosis factor (TNF) alpha suppressor, necrosis glucoprotein, immunotoxin, lymphotoxin, tumor necrosis factor, tumor suppressor, transforming growth factor, alph-1 antitrypsin, albumin, alpha-lactalbumin, apolipoprotein-E, erythropoietin, highly glycosylated erythropoietin, angiopoietins, hemoglobin, thrombin, thrombin receptor activating peptides, thrombomodulin, blood factors, blood factor a, blood factor XIII, plasminogen activators, fibrin-binding peptides, urokinase, streptokinase, hirudin, protein C, C-reactive protein, renin suppressor, collagenase suppressor, superoxide dismutase, leptin, platelet-derived growth factor (PDGF), epidermal growth factor, angiostatin, angiotensin, bone morphogenic protein, bone morphogenesis promoting protein, calcitonin, insulin, atriopeptin, cartilage inducing factor, elcatonin, connective tissue activator, tissue factor pathway inhibitor, follicle stimulating hormone, luteinizing hormone, luteinizing hormone releasing hormone, neurotrophines (for example, nerve growth factor, cilliary neurotrophic factor, axogenesis factor-1, brain-natriuretic peptide, glial derived neurotrophic factor, netrin, neurophil inhibitor factor, neurotrophic factors, neuturin and the like), parathyroid hormone, relaxin, secretin, somatomedin, insulin-like growth factors, corticosteroids, glucagon, cholecystokinin, pancreatic polypeptide, gastrin-releasing peptide, corticotrophin-releasing factor, thyroid stimulating hormone, autotaxin, lactoferrin, myostatin, receptors (for example, TNFR(P75), TNFR(P55), IL-1 receptor, VEGF receptor, B cell activator receptor and the like), receptor antagonist (for example, IL1-Ra), cell surface antigen (for example, CD 2, 3, 4, 5, 7, 11a, 11b, 18, 19, 20, 23, 25, 33, 38, 40, 45, 69 and the like), monoclonal antibody, polyclonal antibody, antibody fragments (for example, scFv, Fab, Fab', F(ab')2 and Fd), and virus-derived vaccine antigen.

The nucleic acids to be physically included in or chemically bound with the hydrogel and film of chondroitin sulfate and hyaluronic acid in accordance with the present disclosure to be delivered into a living body may include DNA, RNA, PNA, and oligonucleotides.

The extracellular matrix to be physically included in or chemically bound with the hydrogel and film of chondroitin sulfate and hyaluronic acid in accordance with the present disclosure to be delivered into a living body may include collagen, fibronectin, gelatin, laminin and vitronectin.

The cells to be physically included in or chemically bound with the hydrogel and film of chondroitin sulfate and hyaluronic acid in accordance with the present disclosure to be delivered into a living body may include stem cells, fibroblasts, vascular endothelial cells, smooth muscle cells, chondrocyte, osteocyte, skin cells, and schwann cell.

When the hydrogel prepared by the method in accordance with the present disclosure was used as cell delivery system, the cells included in the hydrogel were proliferated to be adhered to the surface of the cell cultivating flask after about 2 to 8 weeks and the hydrogel was decomposed in accordance with the conditions of the synthesis. This suggests that the remaining yield and activity of the bioactive material included in the hydrogel of chondroitin sulfate and hyaluronic acid in accordance with the present disclosure are stable.

In another aspect, the present disclosure relates to a method for preparing the hydrogel and film of chondroitin sulfate and hyaluronic acid comprising the steps of (a) preparing a solution of chondroitin sulfate or hyaluronic acid; (b) preparing an acrylate derivative of chondroitin sulfate or hyaluronic acid by covalently binding the chondroitin sulfate or hyaluronic acid with a molecule having at least one unsaturated functional group in it; (c) preparing a lipoamide derivative of chondroitin sulfate or hyaluronic acid by covalently binding the chondroitin sulfate or hyaluronic acid with lipoamide and reducing it to change the disulfide into thiol group; (d) cross-linking the acrylate derivative of chondroitin sulfate or hyaluronic acid with the thiol derivative of chondroitin sulfate or hyaluronic acid.

The step (a) is to dissolve chondroitin sulfate or hyaluronic acid into water to prepare a solution of chondroitin sulfate or hyaluronic acid. The step (b) is covalently to bind chondroitin sulfate or hyaluronic acid with a molecule having at least one unsaturated functional group in it using reaction-inducing material which may include N-(3-dimethylaminopropyl)-N-ethylcarbodiimide (EDC).

In the examples of the present disclosure, EDC was used as the reaction-inducting material. The molar ratio of chondroitin sulfate or hyaluronic acid:linoleic acid:EDC may be variously controlled, and actually at the ratio of 1:2:4, 1:4:2 or 1:5:5, various acrylate derivatives of chondroitin sulfate and hyaluronic acid were synthesized. The step (c) is covalently to bind chondroitin sulfate or hyaluronic acid with lipoamide which has thiol groups (or disulfide group) at the end of its chain using reaction-inducing material which may include EDC.

In the examples of the present disclosure, EDC was used as the reaction-inducting material. The molar ratio of chondroitin sulfate or hyaluronic acid:lipoamide:EDC may be variously controlled, and actually at the ratio of 1:2:4, 1:4:2 or 1:5:5, various thiol derivatives of chondroitin sulfate and hyaluronic acid were synthesized.

In the method for preparing the hydrogel and film of chondroitin sulfate and hyaluronic acid, the step (b) may be to bind chondroitin sulfate or hyaluronic acid with a saccharide derivative having acrylate group in it to shorten the time of synthesis. The molar ratio of the unsaturated functional group and the thiol group may be properly controlled. The molar ratio of the acrylate group and the thiol group is 10:1 to 1:10, preferably 4:1 to 1:3, more preferably 3:1 to 1:2, most preferably 1:1. The molar ratio of the unsaturated functional group and the thiol group is 10:1 to 1:10, preferably 3:1 to 1:2, more preferably 1:1. The molar ratio of the unsaturated functional group and the acrylate group is 100:1 to 1:1, preferably 20:1. Such molar ratios may be controlled in accordance with the characteristics and use of the hydrogel to be prepared.

In the method for preparing the hydrogel and film of chondroitin sulfate and hyaluronic acid, the biological characteristics, physical strength and chemical characteristics of the hydrogel may be different in accordance with various factors such as the molecular weight of the used chondroitin sulfate and hyaluronic acid, the mole number of the bound lipoamide, the concentration of chondroitin sulfate and hyaluronic acid, the kind and concentration of the reaction-inducing material, pH, the molar ratio of the unsaturated functional group and the thiol group to be reacted with each other.

In the method for preparing the hydrogel and film of chondroitin sulfate and hyaluronic acid, the step to physically include or chemically bind a bioactive material into or with the hydrogel may be added depending on the particular purpose.

In a more specific embodiment, one method for preparing the hydrogel of chondroitin sulfate and hyaluronic acid comprises the steps of preparing a solution of chondroitin sulfate or hyaluronic acid; preparing chondroitin sulfate or hyaluronic acid-lipoamide by covalently binding chondroitin sulfate or hyaluronic acid with lipoamide molecule; chemically binding a bioactive material (drug); removing the unreacted reactant from the chondroitin sulfate or hyaluronic acid-lipoamide; drying the chondroitin sulfate or hyaluronic acid-lipoamide; and cross-linking the chondroitin sulfate or hyaluronic acid-lipoamide with chondroitin sulfate-acrylate or hyaluronic acid-acrylate.

In another aspect, the present disclosure relates to a method for preparing a bioactive material carrier comprising the steps of (a) preparing a solution of chondroitin sulfate or hyaluronic acid; (b) preparing a lipoamide derivative of chondroitin sulfate or hyaluronic acid by covalently binding the chondroitin sulfate or hyaluronic acid with lipoamide; (c) mixing a bioactive material with the chondroitin sulfate- or hyaluronic acid-lipoamide derivative or with a chondroitin sulfate- or hyaluronic acid-acrylate derivative; (d) with physically including or chemically binding the biologically active material, cross-linking the chondroitin sulfate- or hyaluronic acid-lipoamide with the chondroitin sulfate- or hyaluronic acid-acrylate. Each of the steps are explained as those set forth above.

The inclusion of the bio active material into the hydrogel of chondroitin sulfate and hyaluronic acid in accordance with the present disclosure may be performed during or after the processes to prepare the gel and film and before its use, but it is preferably performed in the course of the processes, in particular, at the step (c). The active material is mixed into the solution of chondroitin sulfate or hyaluronic acid-lipoamide or the solution of chondroitin sulfate or hyaluronic acid-acrylate and the hydrogel is then synthesized to include the active material in it or to bind the active material with it covalently.

In an embodiment, the method for preparing the bioactive material carrier comprises the steps of preparing a solution of chondroitin sulfate of hyaluronic acid; preparing chondroitin sulfate- or hyaluronic acid-lipoamide by covalently binding chondroitin sulfate or hyaluronic acid with lipoamide molecule; drying the chondroitin sulfate- or hyaluronic acid-lipoamide; mixing a bioactive material with the material of chondroitin sulfate- or hyaluronic acid-acylate; and cross-linking the chondroitin sulfate or hyaluronic acid-lipoamide with the chondroitin sulfate or hyaluronic acid-acrylate derivative.

Hereinafter, the present disclosure will be explained in more detail with concrete examples and comparative examples. The examples are provided for more clear understanding of the present disclosure, but not for limiting the scope of the present disclosure.

EXAMPLES

There were provided examples on the method to chemically bind chondroitin sulfate or hyaluronic acid with lipoamide, its analyses, and cell cultivation results. The cells used for evaluation of cell conformity of the hydrogel in accordance with the present disclosure are those harvested from animals. Osteocytes (MC3T3) were separated from a skull of rat and in vitro extended to use a low generation (p5 or less) of cells.

Example 1

Synthesis of Hyaluronic Acid Hydrogel

First Step: Lipoamide solution (30 mL) was added into hyaluronic acid solution (20 mL). A certain amount of cross-linker was added into the mixture solution of hyaluronic acid and lipoamide and stirred at room temperature for 24 hours to perform the reaction. The resultant solution was lyophilized to a product of hyaluronic acid-lipoamide. In same manner, hyaluronic acid solution was mixed with acrylate solution and cross-linker was added into the mixture to perform the reaction. The resultant solution was lyophilized to a product of hyaluronic acid-acrylate.

Second Step: The hyaluronic acid-lipoamide and hyaluronic acid-acrylate prepared in the first step was respectively dissolved into a suitable solvent to make a solution.

Third Step: Hydrogel was prepared by mixing the two solution prepared in the second step with a certain ratio. In this case, the concentration of the hyaluronic acid-lipoamide and hyaluronic acid-acrylate was variously controlled.

Analysis 1

At a certain time after mixing the two solutions, it was confirmed by naked eyes that gel was formed and this gel was not decomposed to maintain its form after 100 days the gel was dipped into a water solution at room temperature.

Analysis 2

Figure 2:
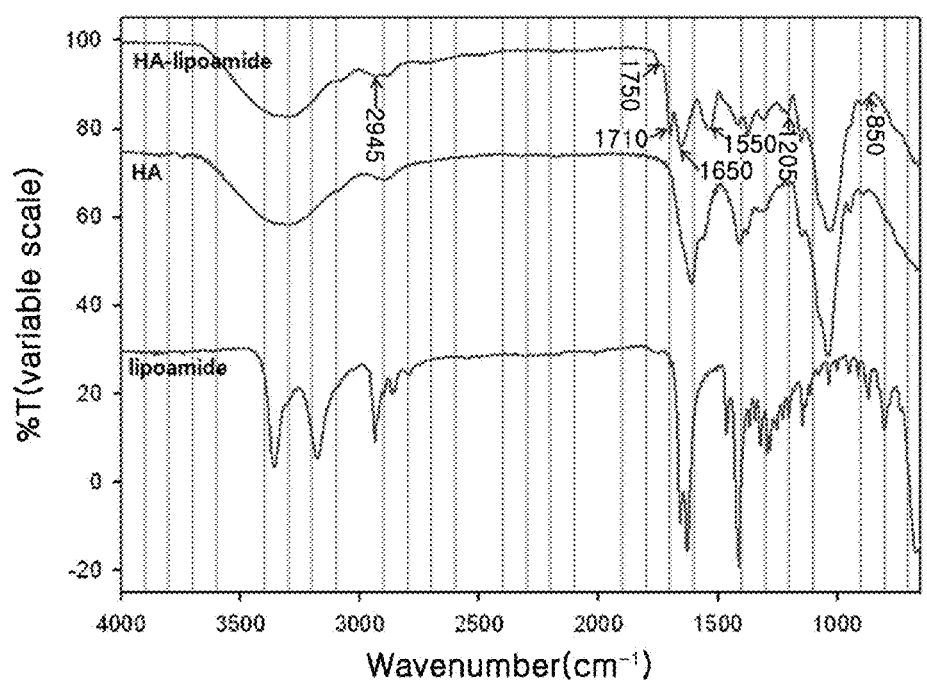
FIG. 2 shows the FT-IR results of hyaluronic acid-lipoamide produced according to an example of the method of the present disclosure.

The evaluation of the hyaluronic acid-lipoamide sample by Fourier Transformed Infrared Spectroscopy (FTIR) showed peak changes and new peak generations at $2940(S-CH_2)$, $1750(C=O)$, $1710(NHC=O)$, $1550(N-H)$, $1205(C-N)$ and $850(S-H)$ wavelength $(cm^{-1})$, which was to confirm the covalent bonding formation between hyaluronic acid and lipoamide (FIG. 2).

Analysis 3

After lyophilization of the hyaluronic acid-lipoamide hydrogel, its weight change in distilled water at each hour was measured for 2 days. It was confirmed that the weight of the prepared hydrogel increased till about 6 hours but stopped increasing after 10 hours. This means that at early stage, the product absorbs water to convert to hydrogel. It was confirmed by naked eyes that the prepared sample was not decomposed in water solution during 1 week so as to form a stable hydrogel.

Analysis 4

Figure 3:
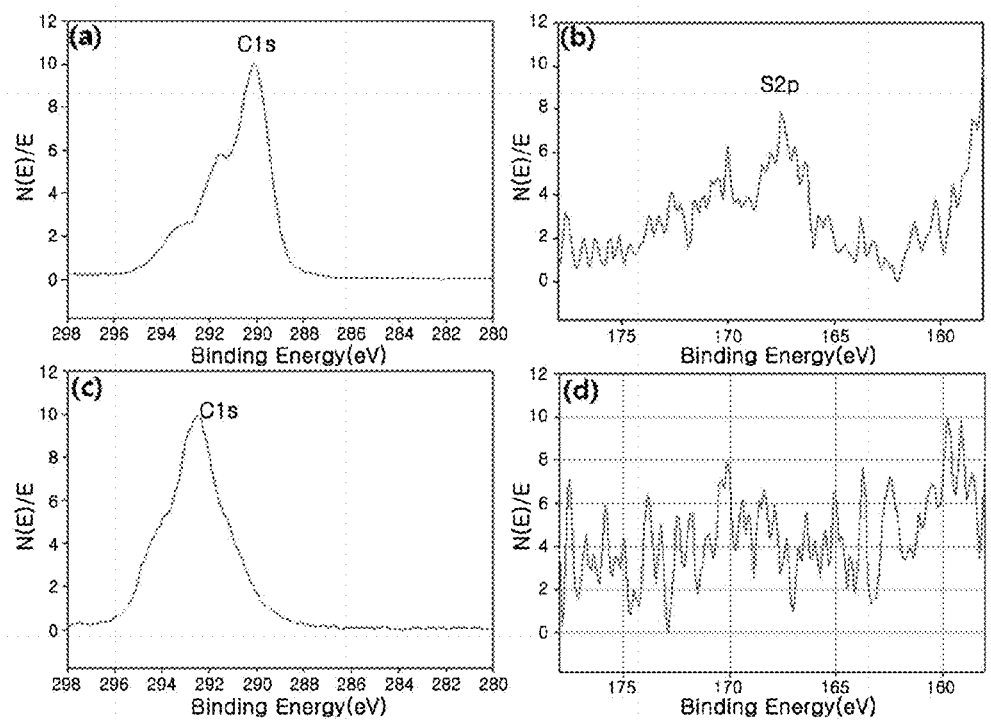
FIG. 3 shows the XPS results of hyaluronic acid-lipoamide produced according to an example of the method of the present disclosure and hyaluronic acid, (a) indicating hyaluronic acid-lipoamide C1s, (b) hyaluronic acid-lipoamide S2p, (c) hyaluronic acid C1s, and (d) hyaluronic acid S2p.

The analysis result by x-ray photoelectron spectroscopy (XPS) for hyaluronic acid-lipoamide synthesized in Example 1 confirmed by the C1s peak change for hyaluronic acid-lipoamide that hyaluronic acid was chemically bound with lipoamide to form a new carbon bonding, and also confirmed by the new S2p peak that a (new) sulfur bond was newly generated at the hyaluronic acid-lipoamide. That is to say, the result confirmed the chemical bonding of hyaluronic acid with lipoamide (FIG. 3).

Analysis 5

Figure 4:
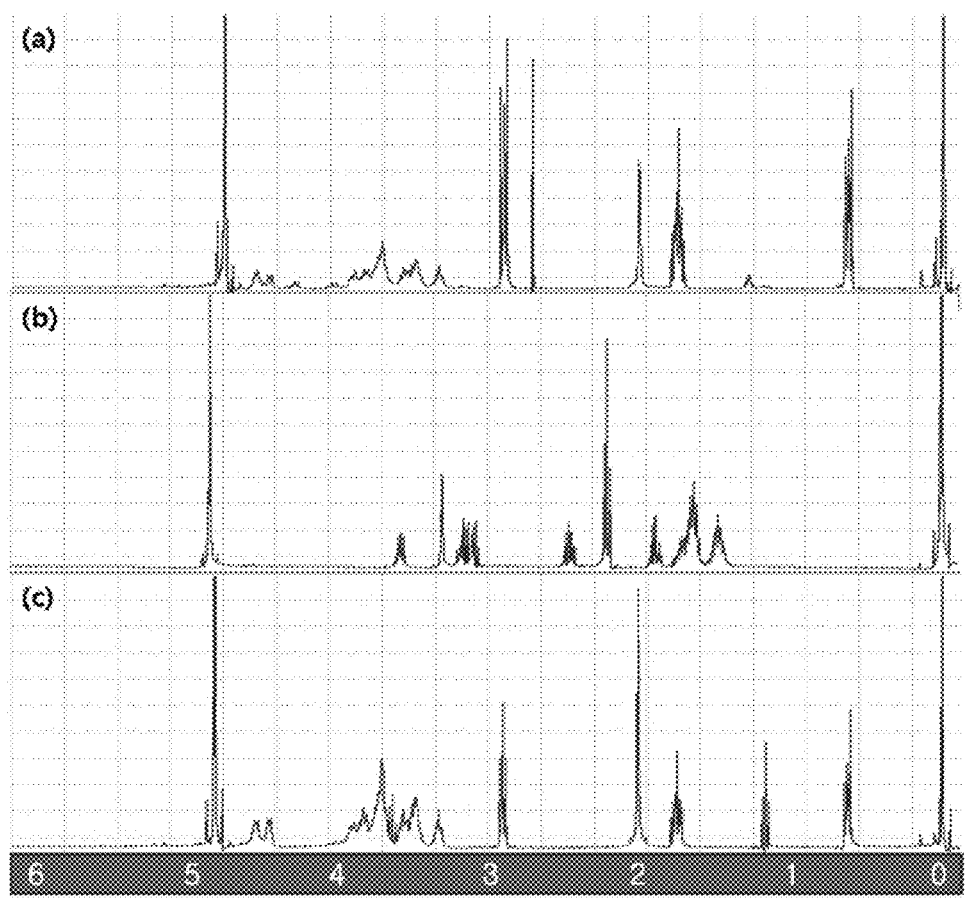
FIG. 4 shows the $^1$H-NMR results of hyaluronic acid-lipoamide produced according to an example of the method of the present disclosure, (a) indicating hyaluronic acid-lipoamide, (b) lipoamide, and (c) hyaluronic acid.

Hyaluronic acid-lipoamide synthesized in Example 1, hyaluronic acid and lipoamide were dissolved in a solvent and analyzed with $^1$H-NMR. The result respectively showed a peak change and new peak generation at 2.7($CH_2$—S) and 1.2($CH_2$—SH) ppm to confirm generation of a new chemical structure. This means that hyaluronic acid was chemically bound with lipoamide (FIG. 4).

Example 2

Synthesis of Hyaluronic Acid-Methacrylate Hydrogel

Methacrylic acid solution was mixed instead of the acrylate solution in Example 1, and a cross-linker was added, and the produced solution was then lyophilized to obtain a product of hyaluronic acid-methacrylate. As same manner of Example 1, the prepared hyaluronic acid-lipoamide was reacted with hyaluronic acid-methacrylate to synthesize the hyaluronic acid hydrogel (See Reaction Formula 2).

Analysis 1

Figure 12:
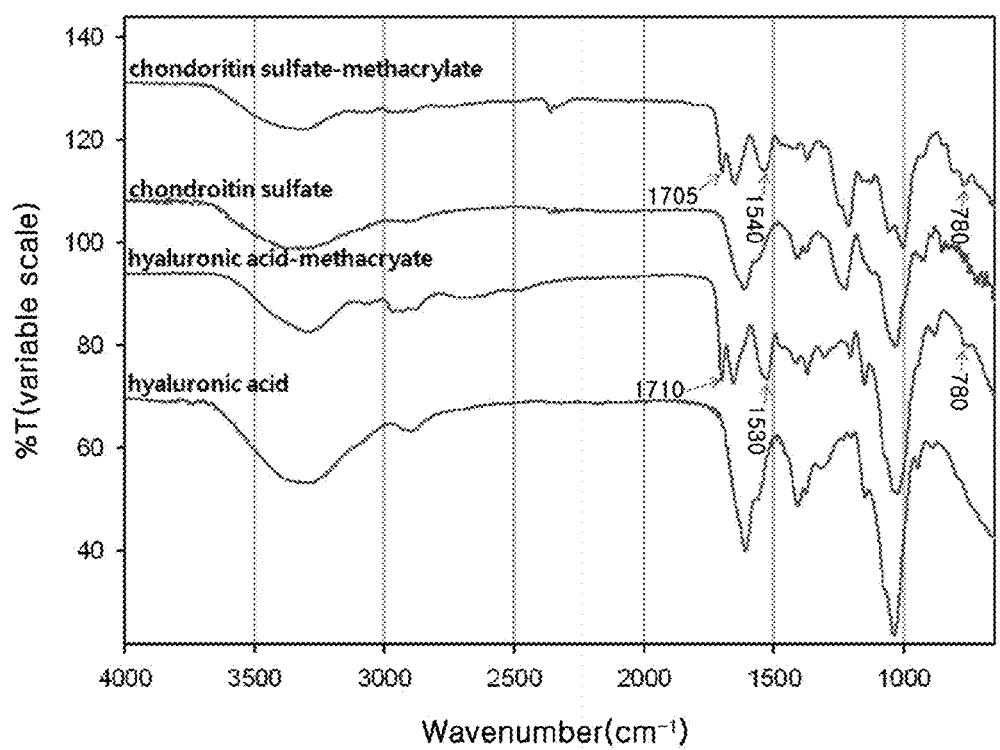
FIG. 12 shows the FT-IR results of hyaluronic acid-methacrylate and chondroitin sulfate-methacrylate produced according to an example of the method of the present disclosure.

The evaluation of the hyaluronic acid-methacrylate sample by Fourier Transformed Infrared Spectroscopy (FTIR) showed peak changes and new peak generations at 1710 (C=O) and 1530(C=C) wavelength ($cm^{-1}$), which was to confirm the covalent bonding formation between hyaluronic acid and methacrylic acid (FIG. 12).

Example 3

Synthesis of Chitosan-Hyaluronic Acid Hydrogel

Chitosan and linoleate solution were used instead of the hyaluronic acid and the acrylate solution in Example 1 to obtain a product of chitosan-linoleate. As same manner of Example 1, the prepared hyaluronic acid-lipoamide was reacted with chitosan-linoleate to synthesize the hyaluronic acid-chitosan hydrogel (See Reaction Formula 3).

Analysis 1

Figure 10:
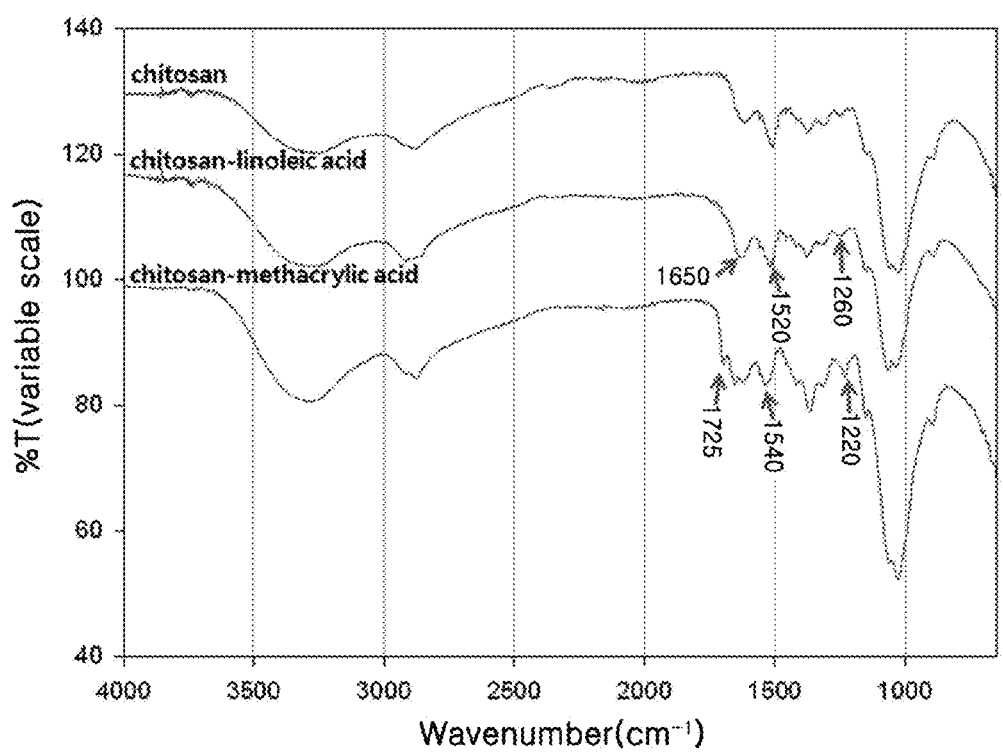
FIG. 10 shows the FT-IR results of chitosan-acrylate produced according to an example of the method of the present disclosure.

The evaluation of the chitosan-linoleate sample by Fourier Transformed Infrared Spectroscopy (FTIR) showed peak changes and new peak generations at 1650(C=O) and 1520 (C=C) wavelength ($cm^{-1}$), which was to confirm the covalent bonding formation between chitosan and linoleic acid (FIG. 10).

Example 4

Synthesis of Carboxymethyl Cellulose-Hyaluronic Acid Hydrogel

Carboxymethyl cellulose was used instead of the hyaluronic acid in Example 1 to obtain a product of carboxymethyl cellulose-acrylate. As same manner of Example 1, the prepared hyaluronic acid-lipoamide was reacted with carboxymethyl cellulose-acrylate to synthesize the hyaluronic acid-carboxymethyl cellulose (See Reaction Formula 3).

Analysis 1

Figure 11:
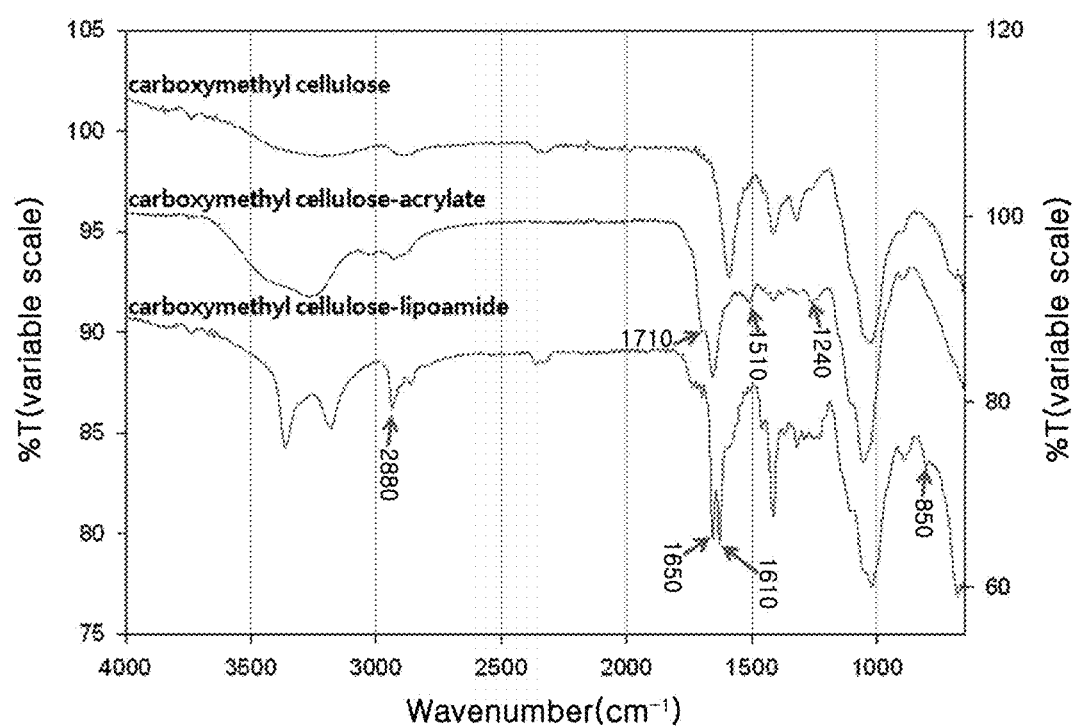
FIG. 11 shows the FT-IR results of carboxymethyl cellulose-acrylate and carboxymethyl cellulose-lipoamide produced according to an example of the method of the present disclosure.

The evaluation of the carboxymethyl cellulose-acrylate sample by Fourier Transformed Infrared Spectroscopy (FTIR) showed peak changes and new peak generations at 1710(C=O) and 1510(C=C) wavelength ($cm^{-1}$), which was to confirm the covalent bonding formation between carboxymethyl cellulose and acrylate (FIG. 11).

Example 5

Synthesis of Hyaluronic Acid-Carboxymethyl Cellulose Hydrogel

Carboxymethyl cellulose was used instead of the hyaluronic acid in Example 1 to obtain a product of carboxymethyl cellulose-lipoamide. As same manner of Example 1, the prepared carboxymethyl cellulose-lipoamide was reacted with hyaluronic acid-acrylate to synthesize the carboxymethyl cellulose-hyaluronic acid hydrogel (See Reaction Formula 1).

Analysis 1

The evaluation of the carboxymethyl cellulose-lipoamide sample by Fourier Transformed Infrared Spectroscopy (FTIR) showed peak changes and new peak generations at 2880(S—$CH_2$), 1650(C=O), 1610(NHC=O) and 850(S—H) wavelength ($cm^{-1}$), which was to confirm the covalent bonding formation between carboxymethyl cellulose and lipoamide (FIG. 11).

Example 6

Synthesis of Carboxymethyl Cellulose-Hyaluronic Acid-Linoleate Hydrogel

Carboxymethyl cellulose and linoleate solution were used instead of the hyaluronic acid and the acrylate solution in Example 1 to be mixed, and a cross-linker was added, and the produced solution was then lyophilized to obtain a product of carboxymethyl cellulose-linoleate. As same manner of Example 1, the prepared hyaluronic acid-lipoamide was reacted with carboxymethyl cellulose-linoleate to synthesize hyaluronic acid-carboxymethyl cellulose hydrogel (See Reaction Formula 3).

Example 7

Synthesis of Chondroitin Sulfate Hydrogel

Chondroitin sulfate was used instead of the hyaluronic acid in Example 1 to obtain chondroitin sulfate-lipoamide. As same manner of Example 1, the prepared chondroitin sulfate-lipoamide was reacted with chondroitin sulfate-acrylate to synthesize chondroitin sulfate hydrogel (See Reaction Formula 1).

Analysis 1

Figure 5:
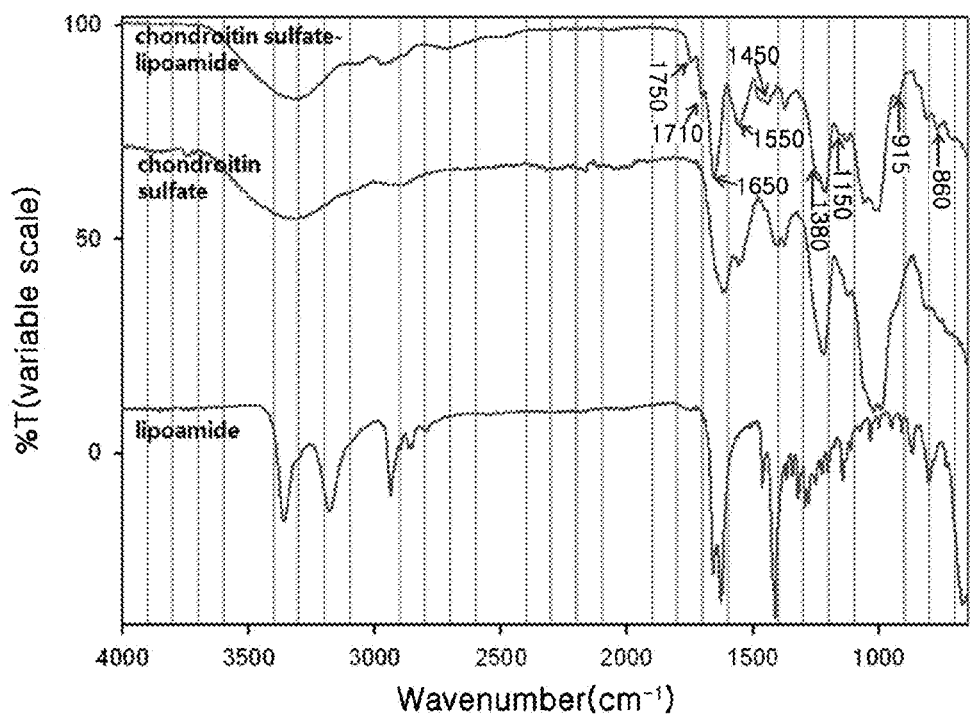
FIG. 5 shows the FT-IR results of chondroitin sulfate, lipoamide and chondroitin sulfate-lipoamide produced according to an example of the method of the present disclosure.

The evaluation of the chondroitin sulfate-lipoamide sample by Fourier Transformed Infrared Spectroscopy (FTIR) showed peak changes and new peak generations at 2980(S—$CH_2$), 1750(C=O), 1710(NHC=O), 1550(N—H), 1310(HS—CH) and 820(S—H) wavelength ($cm^{-1}$), which was to confirm the covalent bonding formation between chondroitin sulfate and lipoamide (FIG. 5).

19

Analysis 2

After lyophilization of the chondroitin sulfate-lipoamide hydrogel, its weight change in distilled water at each hour was measured for 2 days. It was confirmed that the weight of the prepared hydrogel increased till about 6 hours but did not increase after 10 hours. This means that at early stage, the product absorbs water to convert to hydrogel. It was confirmed by naked eyes that the prepared sample was not decomposed in water solution during 1 week so as to form a stable hydrogel.

Analysis 3

Figure 6:
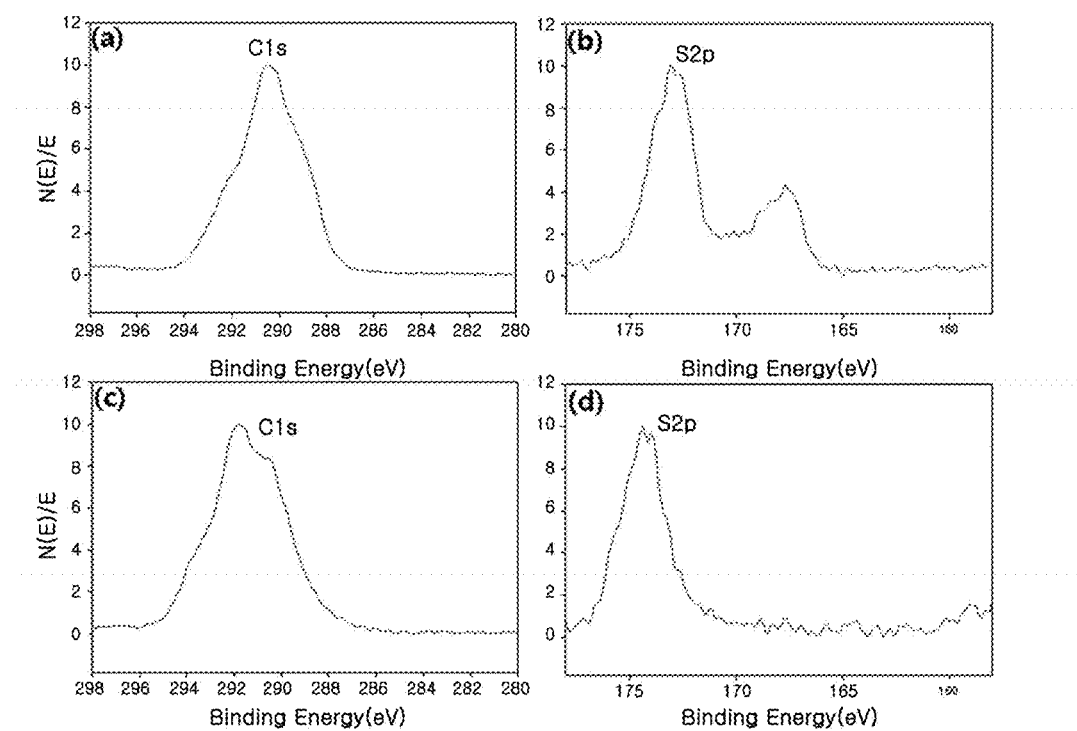
FIG. 6 shows the XPS results of chondroitin sulfate-lipoamide and chondroitin sulfate produced according to an example of the method of the present disclosure, (a) indicating chondroitin sulfate-lipoamide C1s, (b) chondroitin sulfate-lipoamide S2p, (c) chondroitin sulfate C1s, and (d) chondroitin sulfate S2p.

The analysis result by x-ray photoelectron spectroscopy (XPS) for chondroitin sulfate-lipoamide synthesized in Example 2 confirmed, by the C1s and S2p peak changes for chondroitin sulfate-lipoamide, that chondroitin sulfate was chemically bound with lipoamide to form a new carbon bonding and sulfur bonding (FIG. 6).

Analysis 4

Figure 7:
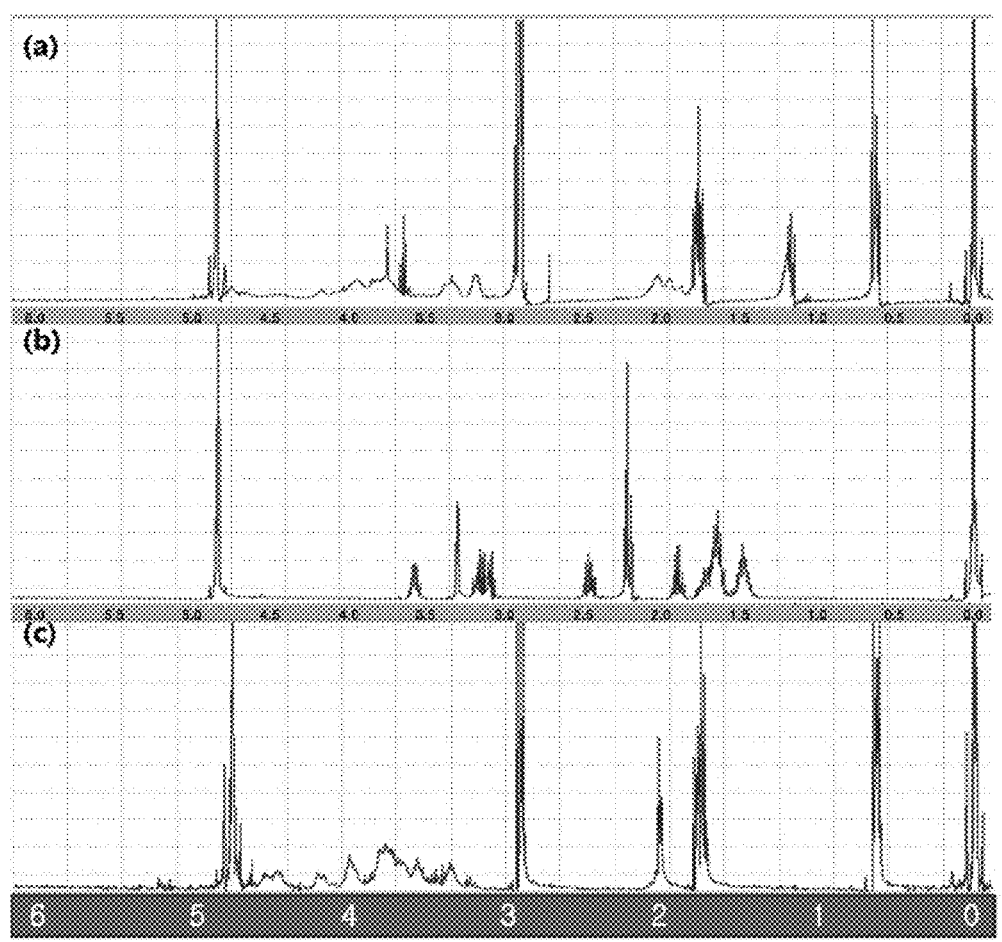
FIG. 7 shows the $^1$H-NMR results of chondroitin sulfate-lipoamide produced according to an example of the method of the present disclosure, (a) indicating chondroitin sulfate-lipoamide, (b) lipoamide, and (c) chondroitin sulfate.

Chondroitin sulfate-lipoamide synthesized in Example 2, chondroitin sulfate and lipoamide were dissolved in a solvent and analyzed with $^1$H-NMR. The results respectively showed a peak change and new peak generation at 2.7($CH_2$—S), 2.0(CH—S) and 1.2($CH_2$—SH) ppm to confirm generation of a new chemical structure. This means that chondroitin sulfate was chemically bound with lipoamide (FIG. 7).

Example 8

Synthesis of Chondroitin Sulfate-Methacrylate Hydrogel

Methacrylate solution was mixed instead of the acrylate solution in Example 7 and a cross-linker was then added to perform the reaction for 6 hours. The produced solution was freezing-dried to obtain chondroitin sulfate-methacrylate. As same manner of Example 3, the prepared chondroitin sulfate-lipoamide was reacted with chondroitin sulfate-methacrylate to synthesize the chondroitin sulfate hydrogel (See Reaction Formula 2).

Analysis 1

The evaluation of the chondroitin sulfate-methacrylate sample by Fourier Transformed Infrared Spectroscopy (FTIR) showed peak changes and new peak generations at 1705(C=O) and 1540(C=C) wavelength ($cm^{-1}$), which was to confirm the covalent bonding formation between chondroitin sulfate and methacrylic acid (FIG. 12).

Example 9

Synthesis of Chitosan-Chondroitin Sulfate Hydrogel

Chitosan was used instead of the chondroitin sulfate in Example 7 to obtain a product of chitosan-linoleate. As same manner of Example 7, the prepared chondroitin sulfate-lipoamide was reacted with chitosan-linoleate to synthesize the chondroitin sulfate-chitosan hydrogel (See Reaction Formula 3).

Analysis 1

The evaluation of the chitosan-linoleate sample by Fourier Transformed Infrared Spectroscopy (FTIR) showed peak changes and new peak generations at 1650(C=O), 1520 (C=C) and 1260(C—N) wavelength ($cm^{-1}$), which was to confirm the covalent bonding formation between chitosan and linoleic acid (FIG. 10).

20

Example 10

Synthesis of Carboxymethyl Cellulose-Chondroitin Sulfate Hydrogel

Carboxymethyl cellulose was used instead of the chondroitin sulfate in Example 7 to obtain a product of carboxymethyl cellulose-acrylate. As same manner of Example 7, the prepared chondroitin sulfate-lipoamide was reacted with carboxymethyl cellulose-acrylate to synthesize the chondroitin sulfate-carboxymethyl cellulose hydrogel (See Reaction Formula 3).

Analysis 1

The evaluation of the carboxymethyl cellulose-acrylate sample by Fourier Transformed Infrared Spectroscopy (FTIR) showed peak changes and new peak generations at 1710(C=O) and 1520(C=C) wavelength ($cm^{-1}$), which was to confirm the covalent bonding formation between carboxymethyl cellulose and acrylate (FIG. 11).

Example 11

Synthesis of Chondroitin Sulfate-Carboxymethyl Cellulose-Linoleate Hydrogel

Carboxymethyl cellulose was used instead of the chondroitin sulfate in Example 7 and linoleate solution was mixed instead of the acrylate solution, and a cross-linker was then added to perform the reaction. The produced solution was lyophilized to obtain a product of carboxymethyl cellulose-linoleate. As same manner of Example 7, the prepared chondroitin sulfate-lipoamide was reacted with carboxymethyl cellulose-linoleate to synthesize the chondroitin sulfate-carboxymethyl cellulose hydrogel (See Reaction Formula 3).

Example 12

Cultivation of Osteocytes on the Surface of Hyaluronic Acid Hydrogel

Figure 8:
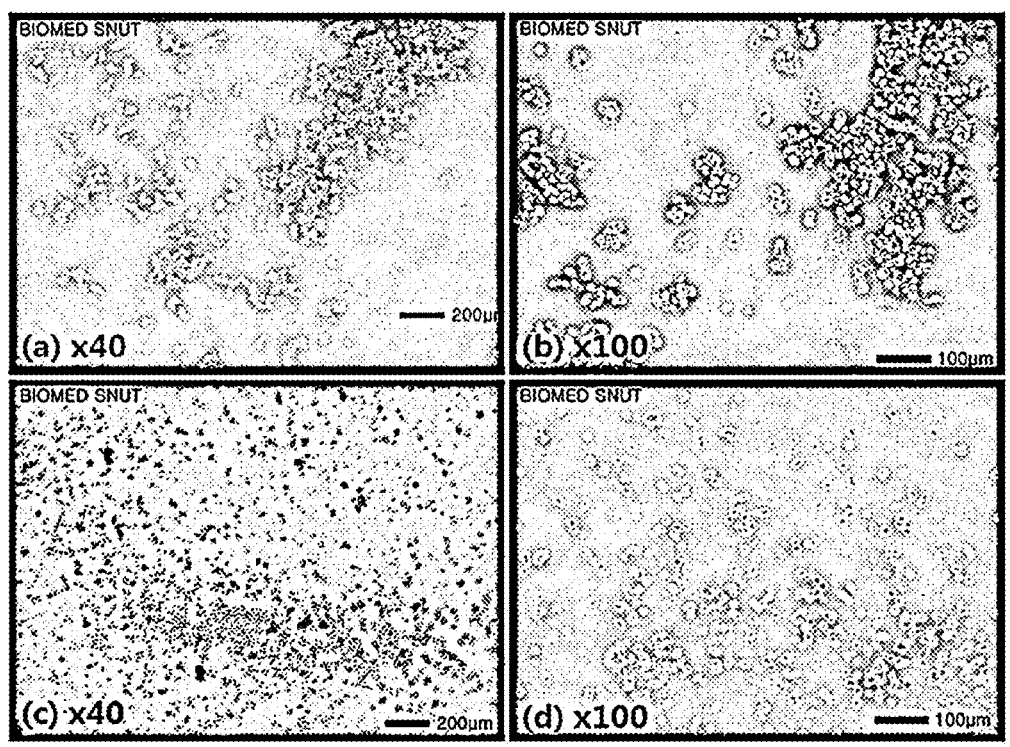
FIG. 8 shows the results that osteoblasts are cultured on the surface of hyaluronic acid hydrogel produced according to an example of the method of the present disclosure, magnified by 40 times at (a) and 100 times at (b) at day one, and by 40 times at (c) and 100 times at (d) at day three.

Osteocytes was in vitro cultivated on the surface of the hyaluronic acid hydrogel synthesized Example 1 and observed for 3 days. Adhesion and extending of the cells and also the active cell proliferation were observed by an optical microscope (FIG. 8).

Example 13

Cultivation of Osteocytes on the Surface of Chondroitin Sulfate Hydrogel

Osteocytes was in vitro cultivated on the surface of the chondroitin sulfate hydrogel synthesized Example 7 and observed for 3 days. Adhesion and extending of the cells and also the active cell proliferation were observed by an optical microscope.

Example 14

Cultivation of Osteocytes on the Surface of Hyaluronic Acid Hydrogel Including Osteocytes 200,000 cells/mL of osteocytes (MC3T3) was mixed with hyaluronic acid-lipoamide in the second step of the hydrogel synthesis process in accordance with Example 1 to obtain the hydrogel including the osteocytes. The cells were in vitro cultivated at 37° C., in the condition of 5% $CO_2$ to observe them by an optical microscope and to evaluate the osteocyte conformity in the hydrogel.

Example 15

Figure 9:
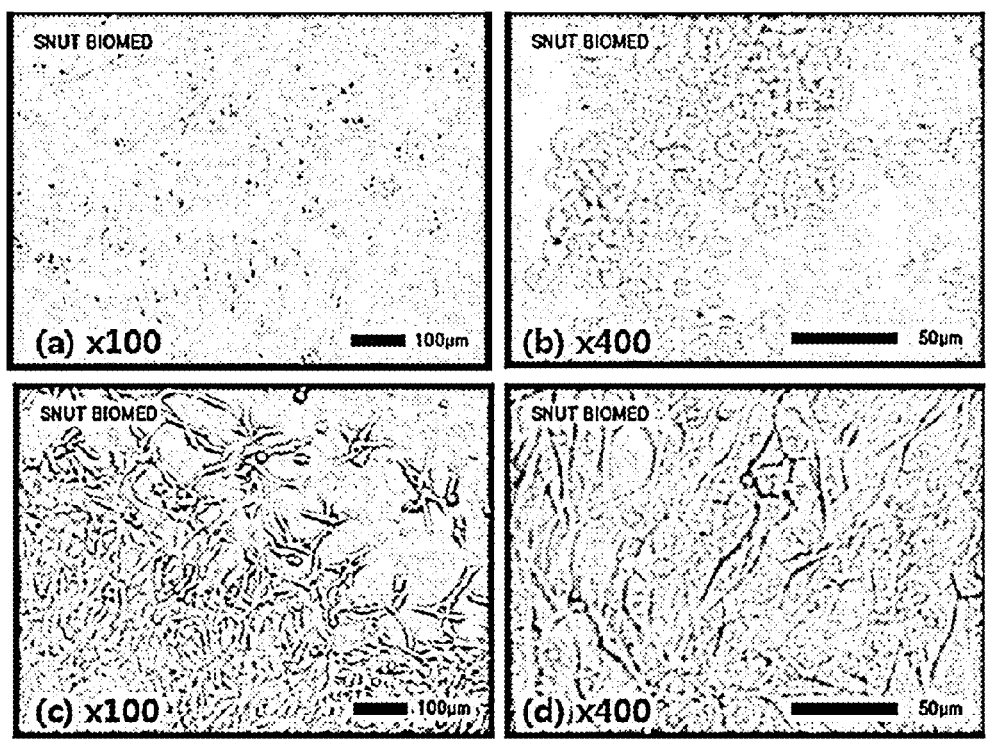
FIG. 9 shows the cell culture results of optical microscope images using chondroitin sulfate hydrogel produced according to an example of the method of the present disclosure in which osteoblast as bioactive material are included, magnified by 100 times at (a) and 400 times at (b) at day two, and by 100 times at (c) and 400 times at (d) at day ten.

Cultivation of Osteocytes on the Surface of Chondroitin Sulfate Hydrogel Including Osteocytes 200,000 cells/mL of osteocytes (MC3T3) was mixed with chondroitin sulfate-lipoamide in the second step of the hydrogel synthesis process in accordance with Example 7 to obtain the hydrogel including the osteocytes. The cells were in vitro cultivated at 37° C., in the condition of 5% $CO_2$ to observe them by an optical microscope and to evaluate the osteocyte conformity in the hydrogel (FIG. 9).

Example 16

Sample in a Form of Film Prepared from the Hydrogels of Hyaluronic Acid and Chondroitin Sulfate The hydrogel solutions of hyaluronic acid and chondroitin sulfate prepared in each of Examples 1 and 7 were mixed together to prepare a sample in a form of film (FIG. 1(B)).

Example 17

Sample in a Form of Film Prepared from the Hybrid Hyaluronic Acid and Chondroitin Sulfate Hydrogels A sample in a form of film was prepared from the hydrogel solutions of the hybrid hyaluronic acid hydrogel prepared in each of Examples 3 and 9 and the chondroitin sulfate hydrogel, using a specific form of mold.

According to the present disclosure, polysaccharides such as hyaluronic acid and the chondroitin sulfate may be used together with highly biocompatible lipoamide by a cross-linking agent to develop into hydrogel for application to reconstruct artificial internal organs, reduce wrinkles, regenerate and treat nerve, bone, skin, and cartilage while the hydrogel may be applied as a dressing agent to provide a burn or beauty treatment or a drug carrier for curing arthritis or cancer, promoting tissue regenerations due to its effective delivery of the drug and cells and the biodegradation of the hydrogel.

The grafted lipoamide is bimolecular and provides an antioxidant, an anti-aging role and wrinkle prevention to render it useful currently as medical cosmetics material and so the comparable biological efficacy is expected. Other anticipated efficacies include a glucose regulation for diabetic patients and a diabetic neuropathy preventive nutrient supplement due to the insulin action enhancement of the lipoamide plus an obesity treatment, weight control, liver detoxification, and heavy metal expulsion effect due to its biological capacity of affecting the appetite control center in the hypothalamus of a brain to result in a suppression of appetites and a promotion of the energy consumption.

Although exemplary embodiments of the present disclosure have been described for illustrative purposes, those skilled in the art will appreciate that various modifications, additions and substitutions are possible, without departing from the scope of the disclosure. Therefore, exemplary embodiments have not been described for limiting purposes. Accordingly, the scope of the disclosure is not to be limited by the above embodiments but by the claims and the equivalents thereof.

What is claimed is:

1. A polymer generated by forming a covalent bond between the amide group of lipoamide and a carboxyl group of a compound selected from the group consisting of heparins, hyaluronic acids, carboxymethyl celluloses, dermatans, chitosans, dextrans, alginates, chondroitin sulfates, peptides, collagens, proteins, hormones, drugs, growth factors, poly(ethylene oxide), poly(vinyl alcohol), poly(vinyl pyrrolidone), polylactides, and polyglycolides;

wherein lipoamide has the following chemical structure:

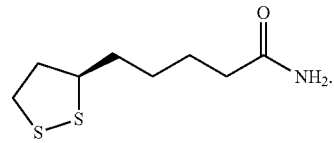 [SMILES: NC(=O)CCCC[C@@H]1CCSS1]

2. The polymer in claim 1, wherein the compound having a carboxyl group is at least one selected from the group consisting of heparins, hyaluronic acids, carboxymethyl celluloses, dermatans, alginates, and chondroitin sulfates.

3. The polymer in claim 1, wherein the compound having a carboxyl group is at least one selected from the group consisting of peptides, collagens, proteins, hormones, drugs and growth factors.

4. The polymer in claim 1, wherein the compound having a carboxyl group is at least one selected from the group consisting of poly(ethylene oxide), poly(vinyl alcohol), poly(vinyl pyrrolidone), polylactides, and polyglycolides having carboxyl group.

* * * * *